United States Patent
Mamidwar

(10) Patent No.: US 8,509,435 B2
(45) Date of Patent: Aug. 13, 2013

(54) METHOD AND SYSTEM FOR A TRANSPORT SINGLE KEY CHANGE POINT FOR ALL PACKAGE IDENTIFIER CHANNELS

(75) Inventor: Rajesh Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1621 days.

(21) Appl. No.: 11/743,511

(22) Filed: May 2, 2007

(65) Prior Publication Data

US 2008/0137852 A1   Jun. 12, 2008

Related U.S. Application Data

(60) Provisional application No. 60/869,019, filed on Dec. 7, 2006.

(51) Int. Cl.
*H04L 29/06* (2006.01)
(52) U.S. Cl.
USPC .......... 380/239; 380/42; 380/200; 380/201; 380/212; 380/277; 713/150; 713/160; 713/193; 726/27; 370/389; 725/100
(58) Field of Classification Search
USPC ............... 380/42, 200, 201, 212, 239, 277; 713/160, 150, 193; 726/27; 370/389; 725/100
See application file for complete search history.

(56) References Cited

U.S. PATENT DOCUMENTS

| | | | |
|---|---|---|---|
| 5,353,351 A * | 10/1994 | Bartoli et al. | 380/33 |
| 6,078,666 A * | 6/2000 | Murakami | 380/37 |
| 7,203,966 B2 * | 4/2007 | Abburi et al. | 726/29 |
| 7,317,797 B2 * | 1/2008 | Vince | 380/239 |
| 2002/0087999 A1 * | 7/2002 | Kashima | 725/100 |
| 2006/0015750 A1 * | 1/2006 | Ashley et al. | 713/193 |
| 2006/0123246 A1 * | 6/2006 | Vantalon et al. | 713/189 |
| 2007/0150960 A1 * | 6/2007 | Dubroeucq et al. | 726/27 |
| 2008/0247550 A1 * | 10/2008 | Kozaki et al. | 380/278 |
| 2009/0153747 A1 * | 6/2009 | Grimes | 348/731 |

* cited by examiner

*Primary Examiner* — Brandon Hoffman
*Assistant Examiner* — Hee Song
(74) *Attorney, Agent, or Firm* — Thomas | Horstemeyer, LLP

(57) ABSTRACT

Methods and systems for a transport single key change point for all package identifier channels are disclosed and may include descrambling a received transport stream comprising multiple package identifier (PID) channels with multiple key change points, and synchronizing at least a portion of the multiple key change points to occur at a common time. The transport stream may be conditional access or copy protect scrambled. The timing of the key change points may be synchronized by modifying one or more scrambling control bits for the descrambled received transport stream. At least one PID channel in said descrambled received transport stream may be re-scrambled utilizing one or more of the scrambling control bits, and a portion of the PID channels may bypass the re-scrambling. The re-scrambling may include one or more of CP re-scrambling and CA re-scrambling. Each PID channel may be de-scrambled and/or re-scrambled utilizing a separate key.

32 Claims, 4 Drawing Sheets

METHOD AND SYSTEM FOR A TRANSPORT SINGLE KEY CHANGE POINT FOR ALL PACKAGE IDENTIFIER CHANNELS

CROSS-REFERENCE TO RELATED APPLICATIONS/INCORPORATION BY REFERENCE

This application makes reference to, claims priority to, and claims the benefit of U.S. Provisional Application Ser. No. 60/869,019, filed on Dec. 7, 2006.

This application also makes reference to:

U.S. patent application Ser. No. 11/743,494, which is filed on May 2, 2007.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to multimedia signal processing. More specifically, certain embodiments of the invention relate to a method and system for a transport single key change point for all package identifier channels.

BACKGROUND OF THE INVENTION

As the speed of Internet traffic increases, on-demand television and video are becoming closer and closer to reality. The introduction of broadband networks, headend and terminal devices such as set-top boxes, and media such as DVD disks recorded with digitally compressed audio, video and data signals, for example, which utilize Motion Picture Expert Group (MPEG) compression standards, may provide sound and picture quality that is virtually indistinguishable from the original material. One of the most popular MPEG standards is MPEG-2, which provides the necessary protocols and infrastructure that may be used for delivering digital television or DVD contents with compressed audio, video and data signals. The MPEG-2 compression scheme compresses and packetize the video content into MPEG-2 packets. A detailed description of the MPEG-2 standard is published as ISO/IEC Standard 13818.

In addition to the increasing speed of Internet transactions, continued advancement of motion picture content compression standards permit high quality picture and sound while significantly reducing the amount of data that must be transmitted. A compression standard for television and video signals was developed by the Moving Picture Experts Group (MPEG), and is known as MPEG-2. An encoded bitstream, such as an MPEG-2 bitstream, comprises different types of data. For example, an MPEG-2 bitstream may comprise audio information, video information, and additional data. A transmitted MPEG-2 bitstream may be received by a set-top box (STB), for example, and the STB may further process the received bitstream. However, since the received bitstream comprises multiple types of data, the STB may utilize multiple decoders. Using multiple decoders to parse the received bitstream is time consuming and may result in processing delays. Furthermore, audio glitches may be generated during decoding when the transport stream input rate, or the played stream rate, may be different from the actual stream rate.

The implementation of fee-based video broadcasting may require a conditional access (CA) system to prevent non-subscribers and unauthorized users from receiving signal broadcasts. Cryptography algorithms may be utilized, for example, in content protection in digital set-top box systems and in other systems utilized in fee-based video broadcasting. Security keys may, therefore, play a significant part in the encryption and/or decryption process initiated by a cryptography algorithm. For each cryptography algorithm used in a fee-based video broadcasting system, for example, there may be a set of associated security keys that may be needed by the algorithm. Each PID channels from a particular program such as an audio PID, and/or a video PID, may have separate keys and key change points for each PID channel may be different. Since a set top box may support multiple programs, it needs to support multiple key change points. As the number of programs supported increases, it may become more burdensome for a processor the process large key change points.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a transport single key change point for all package identifier channels, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a transport single key change point for all package identifier channels. Exemplary aspects of the invention may comprise descrambling a received transport stream comprising multiple package identifier (PID) channels with multiple key change points, and synchronizing at least a portion of the multiple key change points to occur at a common time. The transport stream may be conditional access or copy protected scrambled. The timing of the key change points may be synchronized by modifying one or more scrambling control bits for the descrambled received transport stream. At least one PID channel in the descrambled received transport stream may be re-scrambled utilizing one or more of the scrambling control bits, and a portion of the PID channels may bypass the re-scrambling. The re-scrambling may comprise CP re-scrambling and/or CA re-scrambling. Each PID channel may be de-scrambled and/or re-scrambled utilizing a separate key.

In instances when MPEG-2 systems are used in data processing, programs received by a set top box may be scrambled and keys that are used for scrambling may be changed periodically, for example once every N seconds. To change keys, a headend or service provider may use an even/odd key mechanism. A transport header, or scrambling control (SC) flag may indicate an even or odd key to be used for de-scrambling. The headend may send even key scrambled packets for N seconds and odd key scrambled packets for the next N seconds. Before changing even-to-odd or odd-to-even scrambling, the headend may send encrypted keys on separate PID channels called ECMs (Entitlement Control Messages). Each PID channel from a particular program, such as an audio PID or a video PID, may comprise separate keys, and a key change point for each PID channel may be different. A set top box may need to support multiple programs as well as multiple key change points.

Figure 1:
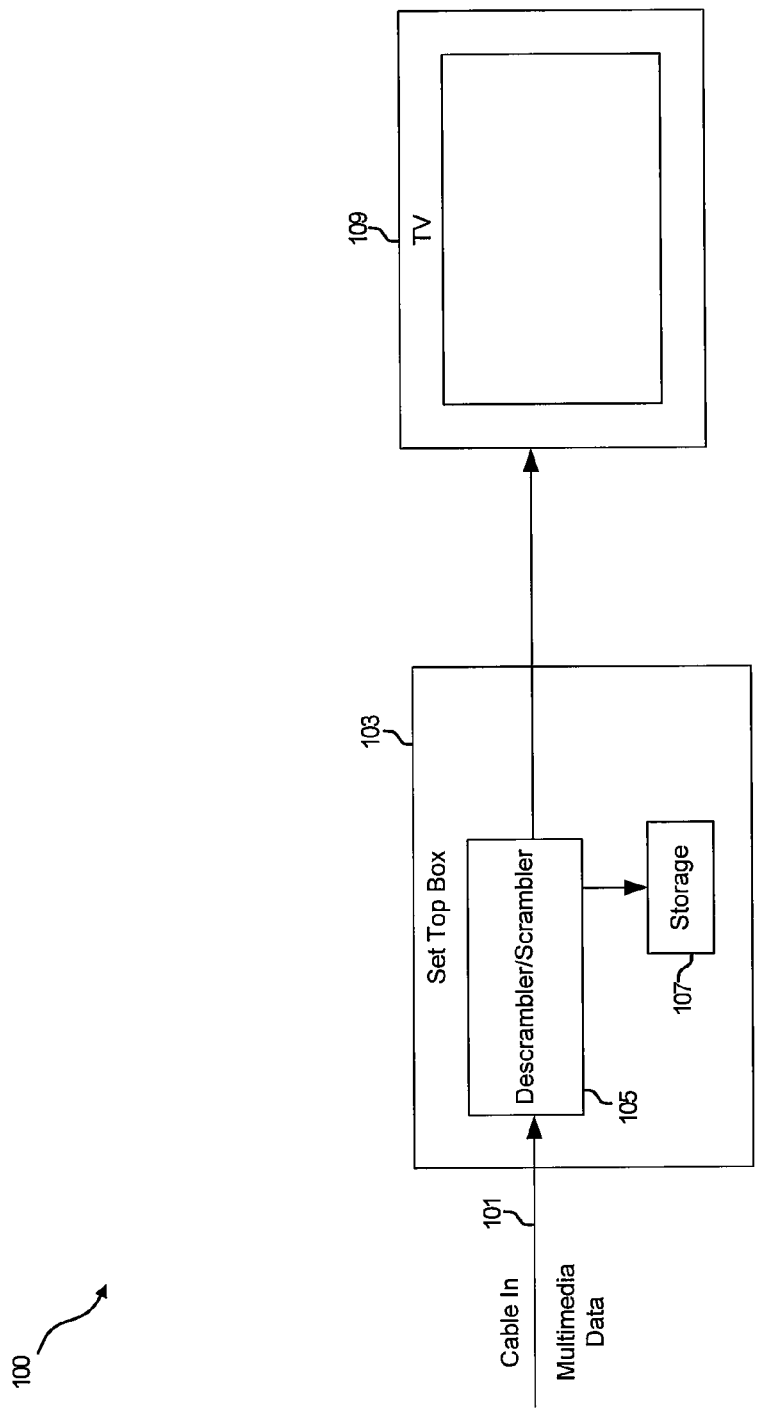
FIG. 1 is an exemplary conditional access descrambling/scrambling system, in accordance with an embodiment of the invention.

FIG. 1 is an exemplary conditional access descrambling/scrambling system, in accordance with an embodiment of the invention. Referring to FIG. 1, there is shown conditional access (CA) descrambling/scrambling system 100 comprising a cable input 101, a television 109 and a set top box 103 comprising a descrambler/scrambler 105 and a storage 107.

The cable input 101 may communicate scrambled MPEG-2 multimedia signals, which may be generated by a headend or service provider, and may comprise audio, video, data and/or voice, for example.

The set top box 103 may comprise suitable circuitry, logic and/or code for receiving multimedia input signals and generating an output signal that may be displayed on the television 109. The set top box 103 may be configured to support multiple programs and multiple key change points, described further with respect to FIG. 2.

The storage 107 may comprise suitable circuitry, logic and/or code that may be enabled to store multimedia data received from the cable input 101 that may have been descrambled by the descrambler/scrambler 105. Although a cable input 101 is shown, the invention is not so limited. Accordingly, other media inputs such as, for example, a satellite feed or a wireless network connection may be provided as an input to the set top box 103.

The descrambler/scrambler 105 may comprise suitable circuitry, logic and/or code that may be enabled to receive a CA scrambled transport stream from, for example, the cable input 101 and descrambling the transport stream for decoding and/or display. The descrambler/scrambler 105 may be enabled to re-scramble the descrambled data for copy protection (CP) prior to storing on the storage 107.

In operation, a multimedia transport stream may be communicated to the set top box 103 via the cable input 101. In instances where the multimedia transport stream may be scrambled for conditional access, for example, the descrambler/scrambler 105 may descramble the transport stream before communicating a signal to the television 109 and may CP scramble the descrambled data before storing the data from the descrambled multimedia transport stream in the storage 107. The descrambling keys may be obtained by the set top box 103 from a separate PID channel in the transport stream, via an entitlement control message (ECM). Following descrambling, the descrambler/scrambler 105 may clear the scrambling control (SC) keys, or may retain the original SC keys and re-scramble the data before storing the data from the descrambled multimedia transport stream in the storage 107.

The conditional access (CA) descrambling/scrambling system 100 may comprise various exemplary functions such as a scrambling/descrambling function, an entitlement control function, and an entitlement management function. The scrambling/descrambling function may be designed to make the program incomprehensible to unauthorized receivers. Scrambling may be applied commonly or separately to the different elementary stream components of a program. For example, the video, audio and data stream components of a TV program may be scrambled in order to make these streams unintelligible. Scrambling may be achieved by applying various scrambling algorithms to the stream components. The scrambling algorithm usually utilizes a descrambling key. Once the signal is received, the descrambling may be achieved by any receiver that holds the descrambling key used by the scrambling algorithm prior to transmission. Scrambling and descrambling operations, in general, may not cause any impairment in the quality of the signals. The descrambling key used by the scrambling algorithm is a secret parameter known only by the scrambler and the authorized descramblers. In order to preserve the integrity of the encryption process, the control word may be changed frequently in order to avoid any exhaustive searches by an unauthorized user, which may be intended to discover the descrambling key.

The CA descrambling/scrambling system 100 may be enabled to scramble and/or randomize transmitted data bits so that unauthorized decoders may not decode the transmitted data bits. Authorized decoders may be delivered a key that initializes the circuit that inverts the data bit randomization. In one aspect of the invention, the scrambling may be associated with the pseudo-random inversion of data bits based on a key that may be valid for a short period of time. In addition to scrambling, a key may also be transformed into an encrypted key in order to protect it from any unauthorized users. In various embodiments of the invention, the CA system descrambling/scrambling system 100 may be enabled to utilize key encryption, and the encrypted keys may be securely distributed.

The CA descrambling/scrambling system 100 may be enabled to provide protection against signal piracy, efficient scrambling, flexibility, support for a variety of formats, and ease of implementation.

For CA or CP, private (secure) keys may be used for scrambling and descrambling high-value content or for protecting highly sensitive transactions. In a CA system, the content scrambling key may be protected. To ensure proper functionality, the CA system may perform scrambling according to the properties of the data for transmission. In addition, the CA system may be enabled to change the key regularly to maintain the security of the scrambling system, and transmit the key information to the receiver in a secure manner using, for example, a hierarchical encryption system.

Figure 2:
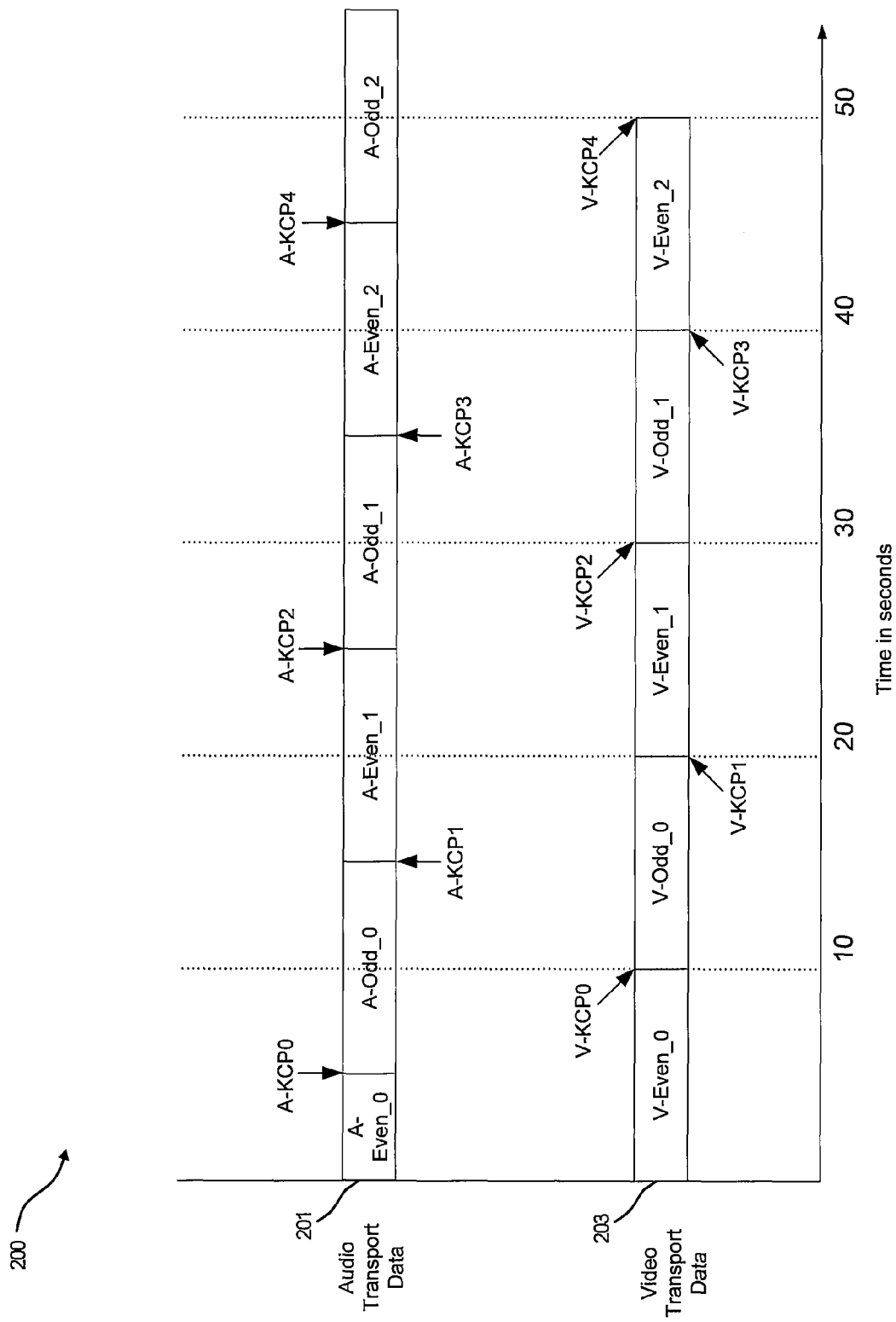
FIG. 2 is a block diagram illustrating exemplary key change points for multiple package identifiers, in accordance with an embodiment of the invention.

FIG. 2 is a block diagram illustrating exemplary key change points for multiple package identifier channels, in accordance with an embodiment of the invention. Referring to FIG. 2, there is shown transport data 200 comprising an audio package identifier (PID) channel 201 and a video PID channel 203. The invention is not limited in the number of PID channels illustrated in FIG. 2. Accordingly, the number and/or type of channels may be determined by the data transport capability, or set-top box requirements, for example.

The audio and video PID channels 201 and 203 may comprise conditional access scrambled data segmented into sections of packets within a defined time-frame that may be scrambled with alternating keys, even and odd, for example. The transitions from odd to even and even to odd may be defined as key change points (KCP) as illustrated in FIG. 2 by A-KCP0, A-KCP1, . . . for audio key change points and V-KCP0, V-KCP1 . . . for video key change points. In the interval between the KCPs, the descrambling key for a PID channel may be constant, until the next KCP, and the keys for different PID channels may be different. For example, the audio keys may be different than the video keys at any given time.

In operation, the audio and video PID channels 201 and 203 may be descrambled by a descrambler such as the descrambler/scrambler 105, described with respect to FIG. 1 The alternating even and odd sections of each PID channel indicate a different descrambling key may be used by the descrambler. Prior to a KCP, the source of the transport data, such as a headend, may send encrypted keys on a separate PID channel, the ECM, described with respect to FIG. 1. The audio and video KCPs may not occur at the same time, which may lead to increased processor and/or software usage. In accordance with various embodiments of the invention, the KCPs for the multiple PID channels may be synchronized to reduce processor and/or software usage and to allow for a single point control of the key changes for all PID channels, and is described further with respect to FIG. 3

Figure 3:
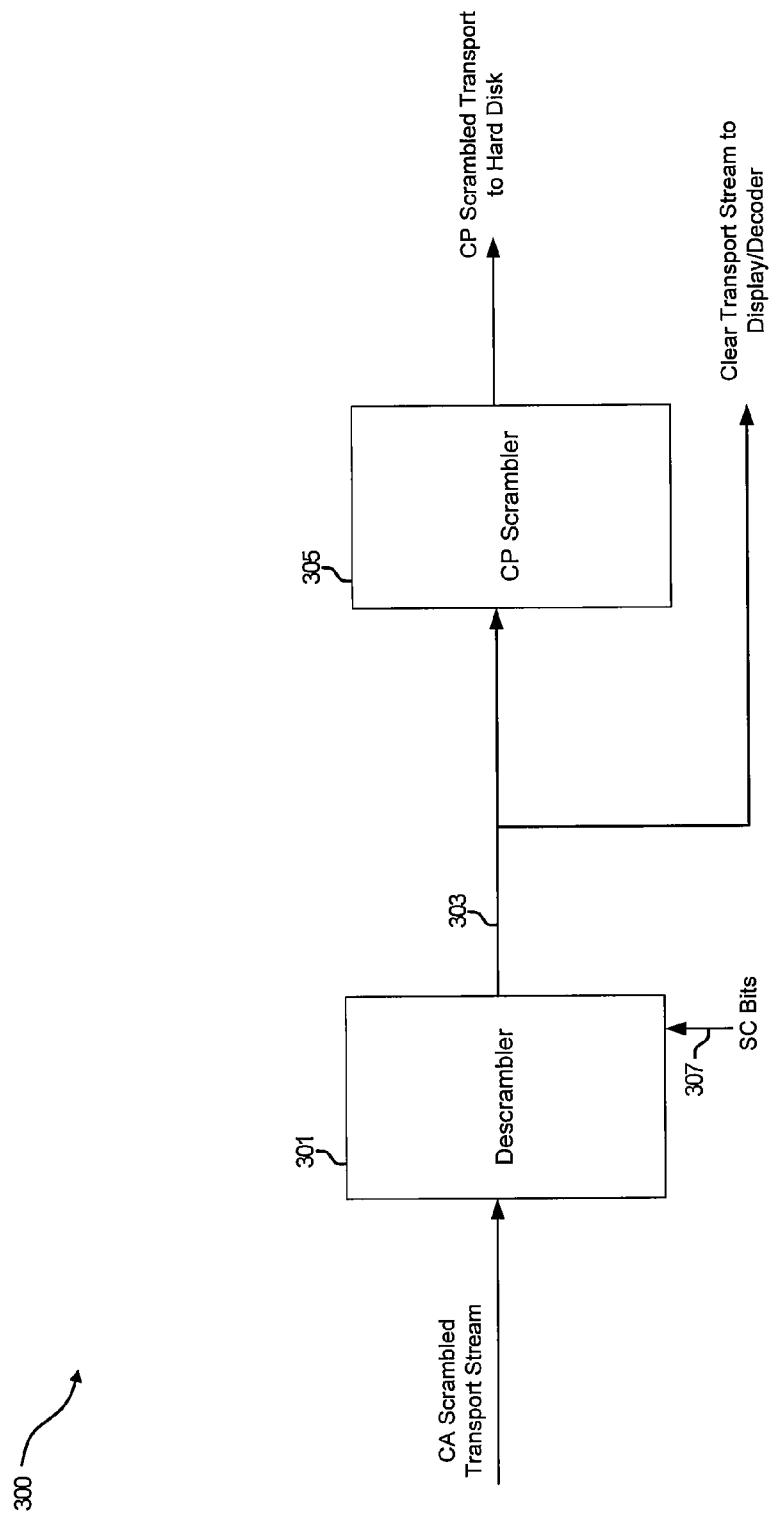
FIG. 3 is a block diagram of a conditional access descrambler with synchronized key change points, in accordance with an embodiment of the invention.

FIG. 3 is a block diagram of a conditional access descrambler with synchronized key change points, in accordance with an embodiment of the invention. Referring to FIG. 3, there is shown conditional access descrambling/scrambling system 300 comprising a descrambler 301, a descrambled signal 303, a copy protection scrambler 305 and SC bits 307.

The descrambler 301 may comprise suitable circuitry, logic and/or code for receiving a CA scrambled transport stream from, for example, the cable input 101 described with respect to FIG. 1, and descrambling the transport stream for decoding and/or display. The descrambler 301 may also receive as inputs, scrambling control (SC) data, the SC bits 307, that may be utilized to synchronized the KCPs on the transport stream to occur at the same time for subsequent CP scrambling.

In operation, a CA scrambled transport stream may be communicated to the descrambler 301, which may descramble the signal and generate a descrambled, or clear, transport stream 303 that may contain synchronized KCPs. The KCPs may be synchronized such that all PID channels may change from odd to even and even to odd keys coincidentally, reducing processor and software requirements. The clear transport stream 303 may be communicated to the CP scrambler 305, which may be enabled to re-scramble the clear transport stream using the KCP scheme forced by the descrambler 301. The SC bits 307 may determine the keys to be utilized by the scrambler 305 for scrambling each of the PID channels, where the keys for all PID channels may be changed at the KCPs. In another embodiment of the invention, one or more of the multiple PID channels, such as the audio and video PID channels 201 and 203, described with respect to FIG. 2, may bypass the CP scrambler 305. The clear transport stream 303 may also be communicated to a display and/or decoder.

Although the key change point scheme described here may be utilized for MPEG-2 transport, the technique may be utilized in any application where multiple key packets may be used for multiple services within the same group simultaneously, as in any secure wired or wireless communication, for example, and may comprise multiple scrambling techniques.

Figure 4:
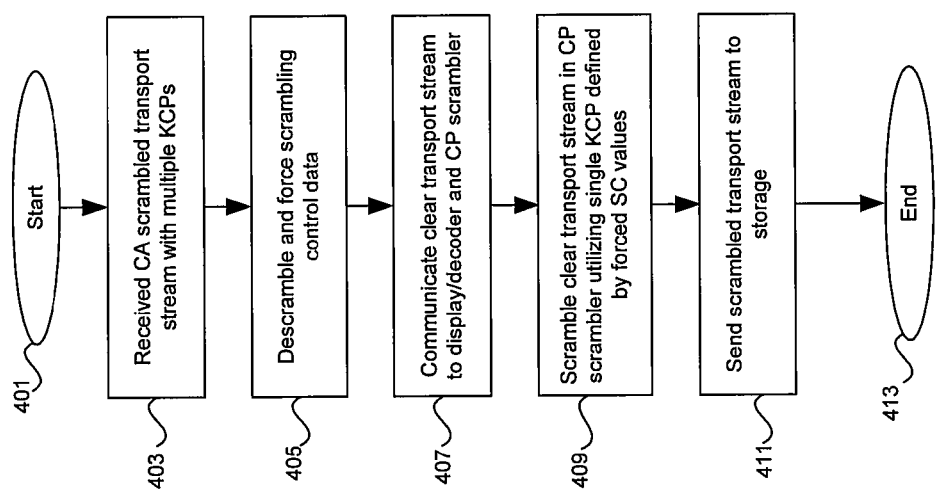
FIG. 4 is a flow diagram illustrating exemplary steps in a conditional access descrambling and copy protection scrambling scheme, in accordance with an embodiment of the invention.

FIG. 4 is a flow diagram illustrating exemplary steps in a conditional access descrambling and copy protection scrambling scheme, in accordance with an embodiment of the invention. Referring to FIG. 4, after start step 401 in step 403, a scrambled transport stream with multiple KCPs may be received by the descrambler 301. In step 405, the transport stream may be descrambled and SC data may be imposed onto the PID channels to create common KCPs for each PID channel, audio and video PID channels 201 and 203. In step 407, the clear transport stream may be communicated to a decoder and/or display and may also be communicated to the CP scrambler 305. In step 409, the CP scrambler 305 may scramble the clear transport stream with single KCP scheme imposed by forced SC data. In step 411, the CP scrambled transport stream may be communicated to the storage 107, followed by end step 413.

In an embodiment of the invention, a received transport stream comprising multiple package identifier (PID) channels, audio and video, for example, with multiple key change points, A-KCP0, A-KCP1, AKCP2, A-KCP3, A-KCP4, V-KCP0, V-KCP1, V-KCP2, V-KCP3 and V-KCP4, may be descrambled and synchronized such that at least a portion of the multiple key change points occur at a common time. The transport stream may be conditional access or copy protected scrambled. The timing of the key change points may be synchronized by modifying one or more scrambling control (SC) bits 307 for the descrambled received transport stream. At least one PID channel in said descrambled received transport stream may be re-scrambled utilizing one or more of the SC bits 307, and a portion of the PID channels may bypass the re-scrambling. The re-scrambling may comprise one or more of CP re-scrambling and CA re-scrambling. Each PID channel may be de-scrambled and/or re-scrambled utilizing a separate key A-Even__0, A-Odd__0, A-Even__1, A-Odd__1, A-Even__2, A-Odd__2, V-Even__0, V-Odd__0, V-Even__1, V-Odd__1, and/or V-Even__2.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing data in a communication system, the method comprising:
    performing by one or more processors, one or more circuits, or any combination thereof:
        descrambling a received transport stream comprising multiple package identifier (PID) channels with a plurality of key change points; and
        synchronizing at least a portion of said plurality of key change points for each PID channel to occur at a common time instant by modifying one or more received scrambling control bits for said descrambled received transport stream, wherein the one or more received scrambling control bits specify a key parity; and
        re-scrambling at least one PID channel in said descrambled received transport stream according to said synchronized key change points utilizing said one or more received scrambling control bits.

2. The method according to claim 1, comprising conditional access descrambling said received transport stream.

3. The method according to claim 1, comprising copy protect descrambling said received multiple PID channel transport stream.

4. The method according to claim 1, comprising controlling timing of said at least a portion of said plurality of key change points via said one or more received scrambling control bits.

5. The method according to claim 1, wherein at least a portion of said at least one PID channel in said descrambled received transport stream bypasses said re-scrambling.

6. The method according to claim 1, wherein said re-scrambling comprises one or more of a copy protection (CP) re-scrambling and a conditional access (CA) re-scrambling.

7. The method according to claim 1, comprising re-scrambling each PID channel in said descrambled received transport stream utilizing a separate key.

8. The method according to claim 1, comprising descrambling each PID channel in said received transport stream utilizing a separate key.

9. A method for processing data in a communication system, the method comprising:
    performing by one or more processors, one or more circuits, or any combination thereof:
    descrambling a received signal comprising multiple data channels with a plurality of key change points;
    synchronizing at least a portion of said plurality of key change points to occur at a common time instant by modifying one or more received scrambling control bits for said received signal, wherein the one or more received scrambling control bits specify a key parity; and
    re-scrambling at least one data channel in said descrambled received transport stream according to said synchronized key change points utilizing said one or more received scrambling control bits.

10. The method according to claim 9, wherein said received signal is a wireless signal.

11. The method according to claim 9, wherein said received signal is a wired signal.

12. The method according to claim 9, wherein said received signal comprises MPEG formatted data.

13. A system for processing data in a communication system, the system comprising:
    one or more circuits that are operable to descramble a received transport stream comprising multiple package identifier (PID) channels with a plurality of key change points; and
    said one or more circuits are operable to synchronize at least a portion of said plurality of key change points to occur at a common time instant by modifying one or more received scrambling control bits for said descrambled received transport stream and to re-scramble at least one PID channel in said descrambled received transport stream according to said synchronized key change points utilizing said one or more received scrambling control bits, wherein the one or more received scrambling control bits specify a key parity.

14. The system according to claim 13, wherein said one or more circuits are operable to conditional access descramble said received transport stream.

15. The system according to claim 13, wherein said one or more circuits are operable to copy protect descramble said received multiple PID channel transport stream.

16. The system according to claim 13, wherein said one or more circuits are operable to control timing of said at least a portion of said plurality of key change points via said one or more received scrambling control bits.

17. The system according to claim 13, wherein at least a portion of said at least one PID channel in said descrambled received transport stream bypasses said re-scrambling.

18. The system according to claim 13, wherein said re-scrambling comprises one or more of a copy protection (CP) re-scrambling and a conditional access (CA) re-scrambling.

19. The system according to claim 13, wherein said re-scrambling comprises utilizing a separate key.

20. The system according to claim 13, wherein said one or more circuits are operable to descramble each PID channel in said received transport stream utilizing a separate key.

21. A system for processing data in a communication system, the system comprising:

one or more circuits that are operable to descramble a received signal comprising multiple data channels with a plurality of key change points; and said one or more circuits are operable to synchronize at least a portion of said plurality of key change points to occur at a common time instant by modifying one or more received scrambling control bits for said descrambled received signal and to re-scramble at least one data channel in said descrambled received transport stream according to said synchronized key change points utilizing said one or more received scrambling control bits, wherein the one or more received scrambling control bits specify a key parity.

22. The system according to claim 21, wherein said received signal is a wireless signal.

23. The system according to claim 21, wherein said received signal is a wired signal.

24. The system according to claim 21, wherein said received signal comprises MPEG formatted data.

25. A non-transitory machine-readable storage medium having stored thereon, a computer program having at least one code section for processing data in a communication system, the at least one code section being executable by a machine for causing the machine to perform:

descrambling a received transport stream comprising multiple package identifier (PID) channels with a plurality of key change points;

synchronizing at least a portion of said plurality of key change points for each PID channel to occur at a common time instant by modifying one or more received scrambling control bits for said descrambled received transport stream, wherein the one or more received scrambling control bits specify a key parity; and re-scrambling at least one PID channel in said descrambled received transport stream according to said synchronized key change points utilizing said one or more received scrambling control bits.

26. The non-transitory machine-readable storage medium according to claim 25, wherein said at least one code section comprises code for conditional access descrambling said received transport stream.

27. The non-transitory machine-readable storage medium according to claim 25, wherein said at least one code section comprises code for copy protect descrambling said received multiple PID channel transport stream.

28. The non-transitory machine-readable storage medium according to claim 25, wherein said at least one code section comprises code for controlling timing of said at least a portion of said plurality of key change points via said one or more received scrambling control bits.

29. The non-transitory machine-readable storage medium according to claim 25, wherein at least a portion of said at least one PID channel in said descrambled received transport stream by-passes said re-scrambling.

30. The non-transitory machine-readable storage medium according to claim 25, wherein said re-scrambling comprises one or more of a copy protection (CP) re-scrambling and a conditional access (CA) re-scrambling.

31. The non-transitory machine-readable storage medium according to claim 25, wherein said re-scrambling comprises utilizing a separate key.

32. The non-transitory machine-readable storage medium according to claim 25, wherein said at least one code section comprises code for descrambling each PID channel in said received transport stream utilizing a separate key.

* * * * *